Nov. 16, 1965 R. TIMMERMAN Re. 25,904
CROSS-LINKING OF POLYVINYLIDENE FLUORIDE AND WIRE COATED WITH THE CROSS-LINKED RESIN
Original Filed Feb. 10, 1961
PHYSICAL CHANGES IN IRRADIATED POLYVINYL FLUORIDE AND POLYVINYLIDINE FLUORIDE
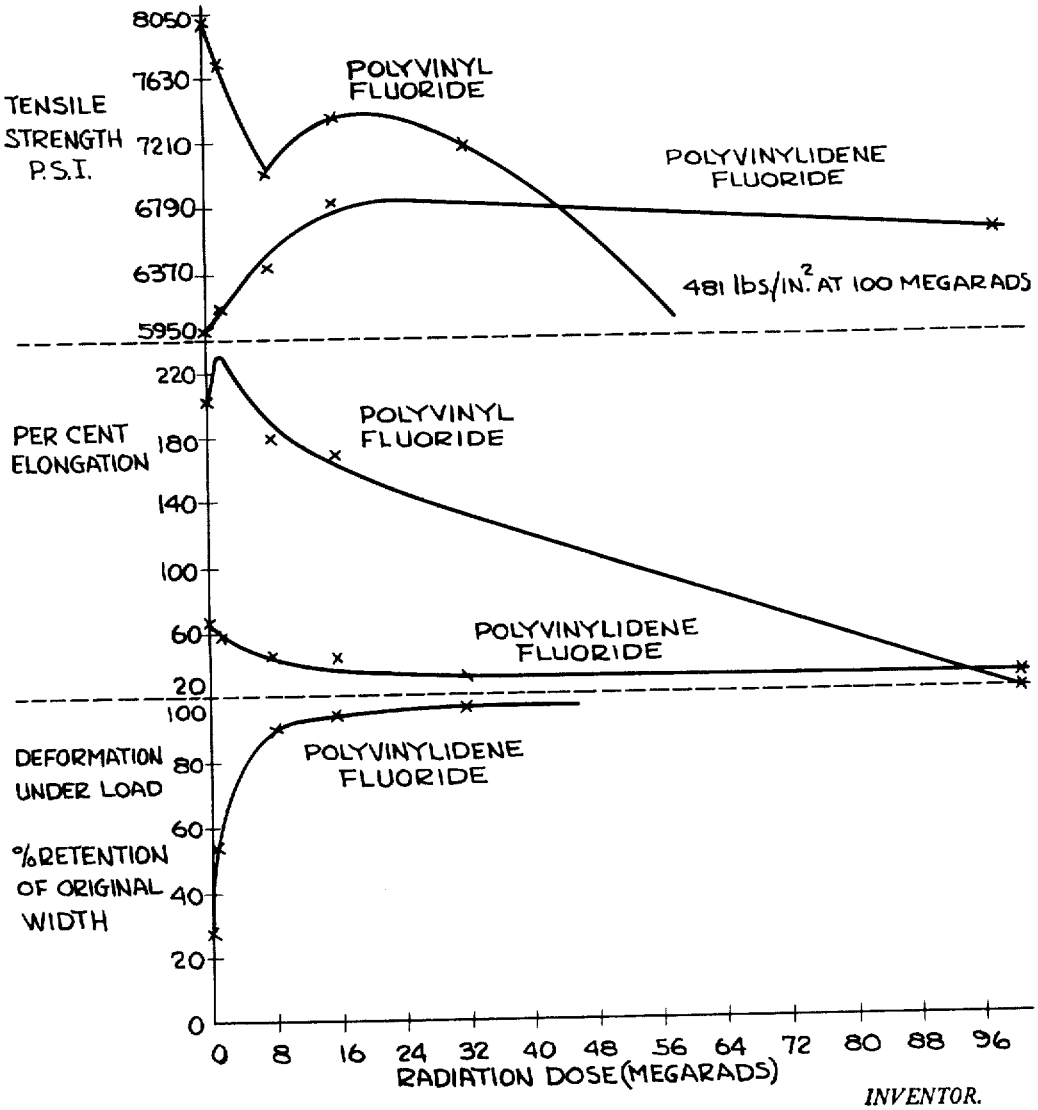
INVENTOR.
ROBERT TIMMERMAN
BY Hurwitz + Rose
ATTORNEYS United States Patent Office Re. 25,904
Reissued Nov. 16, 1965

25,904

CROSS-LINKING OF POLYVINYLIDENE FLUORIDE AND WIRE COATED WITH THE CROSS-LINKED RESIN

Robert Timmerman, South Hadley, Mass., assignor to Radiation Dynamics, Inc., Westbury, N.Y., a corporation of New York Original No. 3,142,629, dated July 28, 1964, Ser. No. 88,393, Feb. 10, 1961. Application for reissue Feb. 24, 1965, Ser. No. 458,525
12 Claims. (Cl. 204—154)

Matter enclosed in heavy brackets [ ] appears in the original patent but forms no part of this reissue specification; matter printed in italics indicates the additions made by reissue.

This invention relates to the irradiation of polymeric materials. More specifically, it relates to the treatment of resinous polyvinylidene fluoride compositions by irradiation with high velocity electrons and to the improved compositions resulting from such treatment.

Many published reports are available relating to the art of the irradiation of fluorinated polymers. Polytetrafluoroethylene (Teflon), which has been widely investigated, is known to deteriorate when irradiated. The experimental evidence of decreases in melt viscosity, elasticity and creep fracture time, together with increases in density and in crystallinity indicate that the deterioration results from chain scission and degradation Similarly, investigations on polymonochlorotrifluoroethylene (Kel F) also indicate the occurrence of severe molecular degradation when the polymer is irradiated.

The low stability of fluorinated polymers in the presence of radiation is unfortunate since otherwise these polymers exhibit very desirable properties. They are quite useful as material for plastic insulators, for molded shapes, and for cast or extruded sheets in applications within the temperature range of 150° C. to 300° C. Advantageously these materials are self-extinguishing when ignited. However, in radiation fields, use of these polymers is not feasible because they degrade so readily upon radiation, and worse, the degradation rate increases at the higher temperatures for which their employment is indicated.

The present invention involves the production of irradiated resinous polyvinylidene fluoride having increased thermal stability as a result of irradiation. The invention also relates to the use of the resulting thermally stable irradiated product for high temperature applications where polytetrafluoroethylene or polymonochlorotrifluoroethylene are normally utilized but cannot be employed, because of ambient radiation. Resinous polyvinylidene fluoride is specifically applicable where greater heat resistance than that of irradiated polyethylene is required.

It has been found that polyvinylidene fluoride resins, a class of materials which can be represented chemically as $(—CH_2—CF_2—)n$, are not degraded by ionizing radiation to at least 100 megarads and, in fact, undergo cross-linking during irradiation thereby upgrading their thermal properties. This result is quite contrary to the general polymer radiation rule which states that polymers with two hydrogen atoms substituted on the same carbon atom degrade when subjected to ionizing radiation such as occur with polyvinylidene chloride, $(—CH_2—CCl_2—)n$, polymethylmethacrylate $$(—CH_2—CCH_3COOCH_3—)n$$

polytetrafluoroethylene $(CF_2—CF_2)n$, and polymonochlorotrifluoroethylene $(CClF—CF_2)n$. When polyvinylidene fluoride was irradiated in air at room temperature, its tensile strength increased, elongation decreased, and deformation under load markedly increased at 200° C. Moreover, tensile strength increased 14.2% up to 16 megarads, but only 10.5% up to 100 megarads. Elongation decreased 35.3% up to 8 megarads, but only 57.6% up to 100 megarads. Deformation under load at 200° C. decreased 89% up to 8 megarads, but only 94.5% up to 32 megarads. Eight megarads appears to be a minimum dose necessary to obtain good structural and thermal properties. The values obtained from the deformation under load at 200° C. indicate a life of at least one hour operation at that temperature. Continuous operation temperature limit is about 180° C., surpassing irradiated polyethylene.

Inasmuch as the irradiating process appears to cross-link the resin and upgrade its physical and thermal properties, substantial variation in the molecular weight of the starting polyvinylidene fluoride is permissible. Thus, for example, a soft somewhat gummy, relatively low molecular weight resin, can be upgraded to a virtually insoluble, infusable high quality resin by application of radiation at the higher end of the specified range, e.g., near 50 megarads. On the other hand, higher molecular weight polyvinylidene fluoride, though not improved physically to such a proportionately great extent by irradiation, can nonetheless be benefited by irradiation at more moderate dosages, e.g., 10 megarads, to attain what is actually the thermally superior product. In any event, the normal practice is employment of a resin which can be readily formed into the desired final shape on conventional plastics working equipment and thereafter irradiated into a tough temperature resistant product. For instance, and in accordance with one form of the present invention, resinous polyvinylidene fluoride may be extruded on wire as the insulating coating therefor; thereafter irradiating the wire at a dosage in the range of about 8–50 megarads. The resulting insulated wire is suitable for the relatively high temperature use of up to 180° C. even in the presence of moderate amounts of radiation.

Since the principal utility contemplated for the products of the present invention is for moderately elevated temperature application, possibly in the presence of radiation, the preferred products of the instant invention are the homopolymers of vinylidene fluoride. By and large, graft polymers, block polymers, copolymers and even mixed polymeric compositions based upon vinylidene fluoride have lower thermal and radiation resistance than the homopolymer. Dilution of the vinylidene fluoride content of more than about 15% by other resin forming organic materials, whether in the form of copolymers, graft polymers, block polymers, etc., is not contemplated. Restated in other language, polyvinylidene fluoride should constitute at least 85% of the resin, and the term "polymer of vinylidene fluoride" as employed herein is intended to be so restricted.

EXAMPLE I

Test slabs of vinylidene fluoride homopolymer (Pennsalt-kynar resin) having a melting point of 340° F. were molded at about 430° F. and irradiated with high velocity electrons at the various dosages of 2, 8, 16, 32 and 100 megarads. The attached drawing graphically shows *the measurable improvement in* the physical properties of the irradiated material as compared to a non-irradiated control slab and as compared to similarly treated polyvinyl fluoride (homopolymer) test slabs.

Similar tests on polyvinylidene fluoride homopolymers of different molecular weights showed comparable improvements through radiation.

EXAMPLE II

The homopolymer of Example I was extruded out as the insulation for a copper wire, then irradiated at a dosage of 16 megarads by high velocity electrons.

One test specimen of the insulated wire exhibited about one hour life at 200° C.

Another test specimen of the wire appeared capable of indefinite service at an operating temperature of 170° C. Service in the presence of radiation did not degrade the insulated wire to the point of unserviceability, at least to the extent of the 100 megarads of radiation applied during this test.

What I claim is:

1. A composition comprising a resinous polymer of vinylidene fluoride cross-linked by high-energy ionizing radiation [of at least] *in a range of approximately* 8 megarads *and higher,* which composition has improved thermal resistance, and tensile strength as compared with the unirradiated vinylidene fluoride polymers.

2. The composition according to claim 1 wherein said composition is cross-linked by between *approximately* 8 and 50 megarads of high-energy ionizing radiation.

3. The composition according to claim 1 wherein said resinous polymer is a homopolymer of [vinylident] *vinylidene* fluoride.

4. A temperature resistant insulated wire comprising an indefinite length of wire, a layer of insulating material surrounding said wire, said material comprising a resinous polymer of vinylidene fluoride cross-linked by [at least 8 megarads of] high-energy ionizing radiation *in a range of approximately 8 megarads and higher.*

5. The insulated wire of claim 4 wherein said resinous polymer is cross-linked by high-energy, ionizing radiation of a dosage between *approximately* 8 and 50 megarads.

*6. A composition comprising a resinous polymer of vinylidene fluoride cross-linked by irradiation with high-energy ionizing radiation in sufficient dosage to provide a measurable improvement in the deformation-under-load characteristic over the unirradiated polymer.*

*7. A composition comprising a resinous homopolymer of vinylidene fluoride cross-linked by irradiation with high-energy ionizing radiation in sufficient dosage to provide a measurable improvement in the deformation-under-load characteristic over the unirradiated homopolymer.*

*8. A temperature resistant insulated wire comprising a length of wire covered by a resinous polymer of vinylidene fluoride cross-linked in situ by irradiation with high-energy ionizing radiation in sufficient dosage to provide a measurable improvement in the deformation-under-load characteristic over the unirradiated polymer.*

*9. A composition comprising a resinous polymer of vinylidene fluoride cross-linked by irradiaion with high-energy electrons in sufficient dosage to provide a measurable improvement in the deformation-under-load characteristic over the unirradiated polymer.*

*10. A temperature resistant insulated wire comprising a length of wire covered by a resinous polymer of vinylidene fluoride cross-linked in situ by irradiation with high-energy electrons in sufficient dosage to provide a measurable improvement in the deformation-under-load characteristic over the unirradiated polymer.*

*11. A composition comprising a resinous polymer of vinylidene fluoride cross-linked by irradiation with high-energy electrons in sufficient dosage to provide a measurable improvement in thermal resistance, and tensile strength as compared with unirradiated vinylidene fluoride polymers.*

*12. A temperature resistant insulated wire comprising an indefinite length of wire, a layer of insulating material surrounding said wire, said material comprising a resinous polymer of vinylidene fluoride cross-linked by irradiation with high-energy electrons in a range of approximately 8 megarads and higher.*

References Cited by the Examiner

The following references, cited by the Examiner, are of record in the patented file of this patent or the original patent.

UNITED STATES PATENTS

| | | | |
|---|---|---|---|
| 2,484,529 | 10/1949 | Roedel | 204—158 |
| 2,865,824 | 12/1958 | Borland et al. | 204—163 |
| 2,907,675 | 10/1959 | Gaylord | 117—47 |
| 2,929,744 | 3/1960 | Mathes et al. | 117—47 |
| 2,957,814 | 10/1960 | Busse et al. | 204—154 |

OTHER REFERENCES

Dixon et al.: "Vinylidene Fluoride Hexafluoripropylene Copolymer," Industrial and Engineering Chem., vol. 49, No. 10, pp. 1687–90, October 1957.

JOHN H. MACK, *Primary Examiner.*